US007988376B2

(12) United States Patent
Todd

(10) Patent No.: US 7,988,376 B2
(45) Date of Patent: Aug. 2, 2011

(54) FLUID APPLICATORS AND METHODS OF MAKING SAME

(75) Inventor: Michael D. Todd, Columbus Junction, IA (US)

(73) Assignee: Thistledown Farms LLC, Columbus Junction, IA (US)

( * ) Notice: Subject to any disclaimer, the term of this patent is extended or adjusted under 35 U.S.C. 154(b) by 1107 days.

(21) Appl. No.: 11/380,920

(22) Filed: Apr. 28, 2006

(65) Prior Publication Data

US 2007/0134051 A1 Jun. 14, 2007

Related U.S. Application Data

(60) Provisional application No. 60/749,658, filed on Dec. 12, 2005.

(51) Int. Cl.
*B43M 11/06* (2006.01)
*B43K 5/00* (2006.01)

(52) U.S. Cl. ......... 401/186; 401/183; 401/205; 401/207

(58) Field of Classification Search ............... 401/183, 401/205, 266, 196, 200, 201–204, 206, 207, 401/186
See application file for complete search history.

(56) References Cited

U.S. PATENT DOCUMENTS

| | | | |
|---|---|---|---|
| 1,598,620 A | 9/1926 | Rhodes et al. | |
| 1,890,599 A | 12/1932 | Cobello | |
| 2,011,635 A * | 8/1935 | Homan | 401/148 |
| 2,820,234 A * | 1/1958 | Rigney | 401/186 |
| 2,853,728 A * | 9/1958 | Nadai | 401/202 |
| 3,002,319 A | 10/1961 | Laughlin | |
| 3,267,610 A | 8/1966 | Hills | |
| 3,393,963 A * | 7/1968 | Nadai | 401/207 |
| 3,471,245 A * | 10/1969 | Schwartzman | 401/207 |
| 3,570,396 A * | 3/1971 | Schwartzman | 101/125 |
| 3,811,783 A * | 5/1974 | Johnson | 401/9 |
| 4,027,986 A | 6/1977 | Patrick | |
| 4,053,243 A * | 10/1977 | Levin | 401/186 |
| 4,126,962 A | 11/1978 | Polcaro | |
| 4,187,638 A | 2/1980 | Hardy et al. | |
| 4,199,896 A | 4/1980 | Lehman | |
| 4,276,718 A | 7/1981 | Keeton et al. | |
| 4,291,491 A | 9/1981 | Maddock | |
| 4,305,224 A | 12/1981 | Maddock | |
| 4,332,107 A | 6/1982 | Reed | |
| 4,357,779 A | 11/1982 | Maddock | |
| 4,369,596 A | 1/1983 | Hartford | |
| 4,403,881 A | 9/1983 | Keeton | |
| 4,409,755 A | 10/1983 | Maddock | |
| 4,426,807 A | 1/1984 | Maddock | |
| 4,486,976 A | 12/1984 | Samuelsson | |
| 4,543,743 A | 10/1985 | Keeton et al. | |
| 4,597,219 A | 7/1986 | Kropf | |

(Continued)

FOREIGN PATENT DOCUMENTS

WO WO-98/42187 10/1998

*Primary Examiner* — David J Walczak
(74) *Attorney, Agent, or Firm* — Schwegman, Lundberg & Woessner, P.A.

(57) ABSTRACT

A fluid application device comprising a holder; a tube connected to the holder; and a porous fluid applicator contained within the holder wherein the holder contacts at least a portion of a bottom surface of the porous fluid applicator. The device allows the dispensing of fluid onto a target area without contacting a non-target area.

16 Claims, 9 Drawing Sheets

U.S. PATENT DOCUMENTS

| | | |
|---|---|---|
| 4,727,678 A | 3/1988 | Struve et al. |
| 4,742,642 A | 5/1988 | Yamamoto |
| 4,747,720 A | 5/1988 | Bellehumeur et al. |
| 4,803,801 A | 2/1989 | Nelson, Jr. |
| 4,884,362 A | 12/1989 | Speidel |
| 4,887,384 A | 12/1989 | Reyne |
| 4,894,948 A | 1/1990 | Eubanks |
| 4,902,155 A | 2/1990 | Buschemeyer |
| 4,908,981 A | 3/1990 | Moore |
| 4,947,580 A | 8/1990 | Moore |
| 4,965,960 A | 10/1990 | Moore |
| 5,019,033 A * | 5/1991 | Geria .................................. 604/2 |
| D334,399 S | 3/1993 | Ziegler |
| 5,196,065 A | 3/1993 | Jozwiak |
| 5,216,833 A * | 6/1993 | Longer ............................ 47/1.5 |
| 5,299,877 A * | 4/1994 | Birden .......................... 401/206 |
| 5,329,727 A | 7/1994 | Dixon |
| 5,388,369 A | 2/1995 | Moore |
| 5,419,078 A | 5/1995 | Polt |
| 5,499,474 A | 3/1996 | Knooihuizen |
| 5,507,115 A | 4/1996 | Nelson |
| 5,555,673 A | 9/1996 | Smith |
| 5,606,822 A | 3/1997 | Dearhammer |
| 5,682,612 A | 11/1997 | Schwarz |
| 5,724,765 A | 3/1998 | Wegner |
| 5,813,122 A | 9/1998 | Mubareka |
| 5,897,267 A * | 4/1999 | Poolman et al. .............. 401/214 |
| 6,014,836 A | 1/2000 | Chester |
| 6,065,244 A | 5/2000 | Randle |
| 6,073,389 A | 6/2000 | Piccolo |
| 6,123,478 A | 9/2000 | Giles |
| 6,190,077 B1 | 2/2001 | Newson et al. |
| 6,367,714 B1 | 4/2002 | Smoot |
| 6,394,681 B1 | 5/2002 | Moore |
| 6,467,981 B1 * | 10/2002 | Gueret ......................... 401/201 |
| 6,491,463 B1 * | 12/2002 | Richard ........................... 401/6 |
| 6,547,880 B1 | 4/2003 | Krueger et al. |
| 6,682,246 B2 * | 1/2004 | Reggiani ....................... 401/264 |
| 6,802,153 B2 | 10/2004 | DuBois et al. |
| 7,004,659 B1 * | 2/2006 | Goodman ................. 401/188 R |
| 2002/0076258 A1 * | 6/2002 | Crosby et al. ................. 401/205 |

* cited by examiner

FLUID APPLICATORS AND METHODS OF MAKING SAME

CROSS-REFERENCE TO RELATED APPLICATION

This application claims the benefit under 35 U.S.C. 119 (e) of U.S. Provisional Application No. 60/749,658, filed on Dec. 12, 2005, which is hereby incorporated by reference in its entirety.

FIELD

The present subject matter relates generally to applicators, and in particular, to fluid applicators and methods of using same.

BACKGROUND

There are many know devices for applying fluids. In many instances, it is important to limit the fluid application to specific areas without allowing the fluid to contact surrounding areas. For example, when applying herbicide to target plants surrounded by desirable non-target plants, it is imperative that the herbicide not contact the non-target plants. Attempts to solve this problem include devices that limit the area of spray through use of partial shields. However, such devices generally do not provide complete selectivity. Other devices may provide greater selectivity, but are typically complex and expensive with numerous moving parts. Yet other devices are difficult or awkward to use and must be connected to other devices such as a lawn mower.

For the reasons stated above, and for other reasons stated below which will become apparent to those skilled in the art upon reading and understanding the present specification, there is a significant need in the art for systems and methods for improved application of fluids.

SUMMARY

A fluid application device comprising a holder; a tube connected to the holder; and a porous fluid applicator contained within the holder wherein the holder contacts at least a portion of a bottom surface of the porous fluid applicator is provided. In one embodiment, the tube is rigid and the holder is flexible. The device can further comprise a flow regulator contained within the holder or tube, such as a porous flow regulator. The porous flow regulator and porous fluid applicator can be made from any suitable material such as a sponge. In one embodiment, the holder contacts the bottom surface of the porous fluid applicator with a lip. In another embodiment, the holder contacts the bottom surface of the porous fluid applicator with a cover, which can be removable. In one embodiment, stencils can be inserted between the lip and the porous fluid applicator. In one embodiment, the cover itself serves as a stencil.

The device further comprises a fluid reservoir connectable to the tube. The reservoir can contain one or more handles of any type. The reservoir can take on any configuration from a flexible plastic container to a backpack or fanny pack.

The device is useful for applying many types of fluid, such as herbicide, paint, and so forth, to any surface, which can be anything from substantially horizontal surface (e.g., floor, ground) to a substantially vertical surface (e.g., walls).

Embodiments of the invention further include a method of applying fluid which include providing a reservoir containing a fluid; applying force to a porous fluid applicator contained within a holder, the holder connected to the reservoir, wherein fluid is dispensed from the reservoir, through the porous fluid applicator and into a target area and no fluid is dispensed in a non-target area. In one embodiment, the force is applied by applying a downward force to a rigid tube connected on one end to the reservoir and on the other end to a flexible holder. In one embodiment, the method further comprises controlling flow rate with a porous flow regulator located in the rigid tube or flexible holder. In another embodiment there is more than one flow regulator located in the rigid tube and/or flexible holder.

Embodiments of the invention further include a kit comprising a fluid application device having a holder which maintains contact with at least a portion of a bottom surface of a porous fluid applicator; and instructions for using the fluid application device. The kit can further contain, under separate packaging, fluid for use with the device as well as replacement parts, such as flow regulators, porous fluid applicators, stencils, and the like.

The device described herein is easy to use and preferred embodiments have no moving parts. Unlike conventional devices which only partially shield non-target areas, the device described herein provides complete shielding of non-target areas.

DETAILED DESCRIPTION

Figure 1:
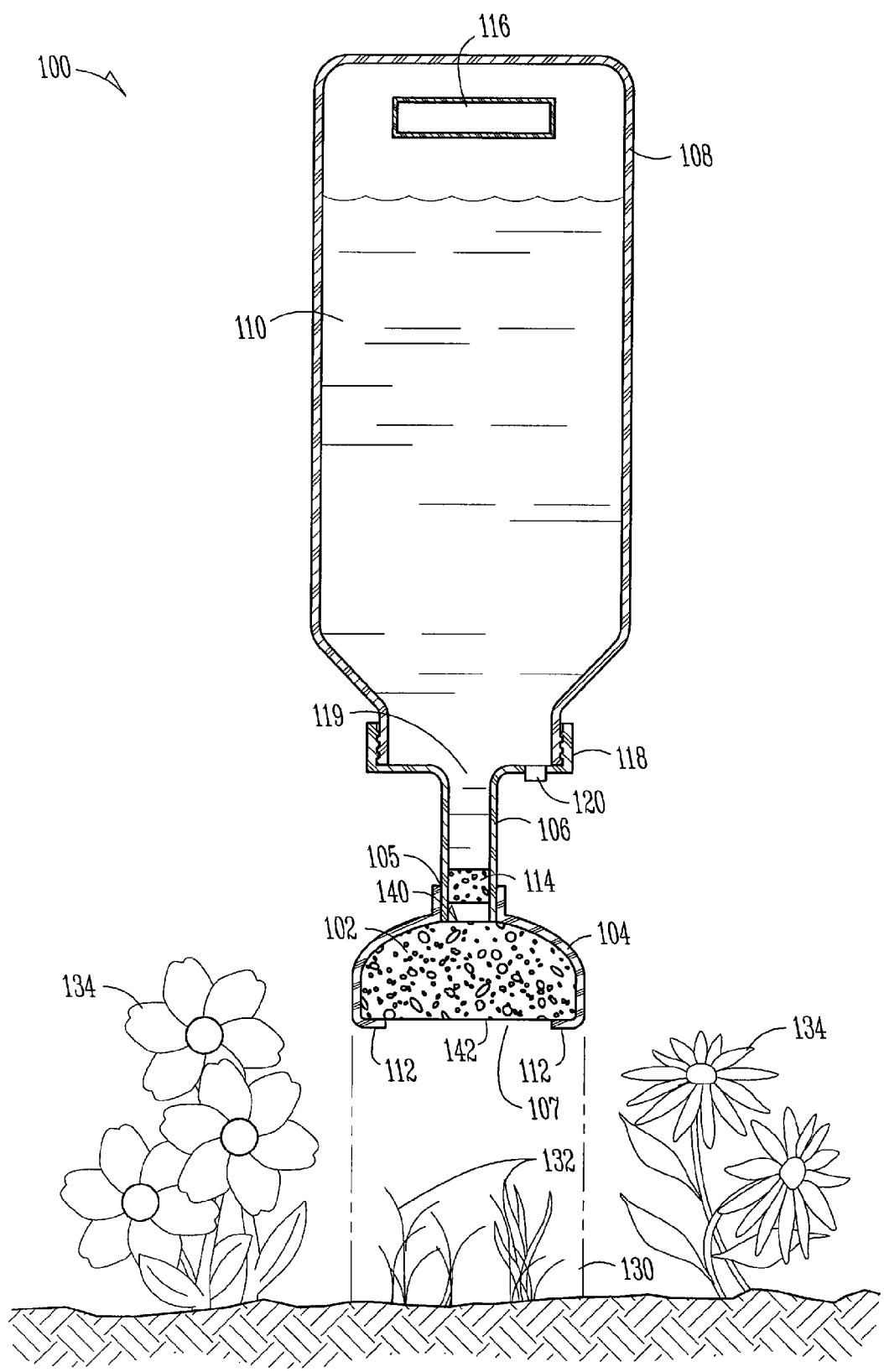
FIG. 1 is a vertical sectional view of a fluid application device in a first position in one embodiment of the present invention.

In the following detailed description of embodiments of the invention, reference is made to the accompanying drawings that form a part hereof, and in which is shown by way of illustration, specific preferred embodiments in which the subject matter may be practiced. These embodiments are described in sufficient detail to enable those skilled in the art to practice them, and it is to be understood that other embodiments may be utilized and that mechanical, structural, and procedural changes may be made without departing from the spirit and scope of the present subject matter. The following detailed description is, therefore, not to be taken in a limiting sense, and the scope of embodiments of the present invention is defined only by the appended claims, along with the full scope of equivalents to which such claims are entitled.

A fluid application device is disclosed. In the embodiment shown in FIG. 1, the fluid application device 100 is comprised of a fluid applicator 102, a holder 104, a tube 106 and a reservoir 108. In the embodiment shown in FIG. 1, the holder 104 has top opening 105 and a bottom opening 107 (surrounded by a lip 112) through which the fluid applicator 102 can protrude when in use. In most embodiments, the holder 104 is flexible and connected to the tube 106 which is non-flexible or rigid. In the embodiment shown in FIG. 1, the tube 106 is connected to the holder 104 via the top opening 105. The tube 106 in turn is connected to the reservoir 108 which is shown substantially filled with a desired fluid 110. In this embodiment, the lip 112 secures the fluid applicator 102 and aids in shielding non-target areas from contact with the fluid 110. In an alternative embodiment a cover is used to shield non-target areas (See FIGS. 4 and 5). In this embodiment, the fluid application device 100 further has a flow regulator 114 contained within the tube 106, although the invention is not so limited. In some embodiments there is no flow regulator 114. However, the flow regulator 114 is useful in embodiments in which the fluid 110 is relatively thin, i.e., such as a water soluble herbicide. In other embodiments there may be multiple flow regulators 114.

The holder 104 and tube 106 can have any suitable size and shape. In one embodiment, the tube 106 is cylindrical in shape, although the invention is not so limited. The holder 104 can take on any number of configurations, such as a cone shape, bell shape, and so forth. The joint between the holder 104 and the tube 106 can take on any number of configurations with some additional examples shown in FIGS. 6, 7, 8 and 9. In the embodiment shown in FIG. 1, the holder 104 is secured to the tube 106 with a press fit arrangement which can optionally be further secured with any suitable type of connecting means, such as adhesive means, clamping means, etc.

The reservoir 108 can take on any number of configurations. In the embodiment shown in FIG. 1, the reservoir 108 is substantially rectangular, although it can also be square, cylindrical, and so forth. In other embodiments, the reservoir is a backpack or fanny pack or is contained therein. (See FIGS. 11 and 12). The reservoir 108 can be either rigid or flexible. However, a flexible reservoir 108 has the advantage of allowing the user to squeeze it to express additional fluid 110 when the reservoir 108 is nearly empty, adjust the flow rate, and so forth.

The tube 106, which in the embodiment shown in FIG. 1 is rigid, is connected on one end to the reservoir 108 and on the other end to the holder 104, is used to apply pressure to the holder 104. The tube 106 can be secured to the reservoir 108 in any suitable manner. In the embodiment shown in FIG. 1, a cap 118 having a suitably-sized cap opening 119 through which the fluid 110 can flow is used to secure the reservoir 108 to the tube 106. The cap 118 can be removably or permanently secured to the tube 106 and/or to the reservoir 108 in any suitable manner. In one embodiment, the cap 118 is removable from the tube 106 via a threaded connection or a press fit arrangement, such as with a nipple located on the cap 118 and securable to the tube 106. In such an embodiment, the cap 118 can be more permanently secured with any suitable type of adhesive or temporarily secured with any suitable type of clamp. Use of additional means, such as caulking or any type of sealant can also help to prevent leaking and/or to prevent the two components from separating. Additionally or alternatively, a gasket can also be used as is known in the art. In the embodiment shown in FIG. 1, the cap 118 and tube 106 are integral.

The cap 118 and reservoir 108 can also be connected in any suitable manner. In the embodiment shown in FIG. 1, the cap 118 and reservoir 108 are joined with a threaded connection. In the embodiment shown in FIG. 1, the cap 118 further has an optional vent 120 as is known in the art, which helps to equalize pressure for faster distribution of the fluid 110. Such a vent 120 is useful in embodiments in which the viscosity of the fluid 110 is greater than the viscosity of a water-based herbicide, such as paint, although the invention is not so limited.

FIG. 1 further shows an enclosed opening 116 in the upper part of the reservoir 108 which can be used as a handle or as hooking means during storage, although the invention is not so limited. In embodiments in which the enclosed opening 116 is used as a hooking means to store the device in the position shown in FIG. 1, it may be desirable to take measures to prevent the fluid 110 from draining out of the reservoir 108, such as replacing the cap 118 with a storage cap which does not contain a cap opening 119, draining the fluid 110 from the reservoir 108 prior to storage, and so forth. In an alternative embodiment, the reservoir 108 contains one or more dents to serve as hand grips. In yet other embodiments, one or more of any type of conventional or molded handle or handles can additionally or alternatively be located on the top and/or sides that allow for one or two-handed operation (See, for example, FIG. 10) and further allows the device 100 to be easily carried. In some embodiments, there is no handle of any type, although a handle adds convenience for the user.

In the embodiment shown in FIG. 1, the device 100 has been inverted from a conventional storage position so that fluid 110 will exit the reservoir 108. (Again, the device 100 can be stored in this position and the fluid 110 should remain contained within the device 100 as long as no pressure is applied to the fluid applicator 102. However, it may be desirable to take the precautions as described above. Additionally or alternatively a storage cap can be placed over the bottom of the holder 104 to prevent the fluid 110 from evaporating).

In FIG. 1, the device 100 is shown positioned above a target area 130 containing non-desirable weeds 132. Anything outside the target area 130 is a non-target area to which fluid 110 should not be applied. It may be that application of fluid outside the target area 130 would affect the appearance of the non-target area or kill or otherwise adversely affect desirable plants in the non-target area. In the embodiment shown in FIG. 1, the fluid 110 being applied is an herbicide such that contact of the fluid 110 outside the target area 130 would be detrimental to desirable flowers 134 located adjacent to the target area 130.

Once inverted as shown, gravity causes fluid 110 to flow from the reservoir 108 through the tube 106 and through the flow regulator 114, if present. The fluid 110 then exits the flow regulator 114 and saturates the fluid applicator 102. The low pressure of the gravity feed prevents the fluid 110 from dripping out prematurely. In the embodiment shown in FIG. 1, the fluid applicator 102 fills the entire interior of the holder 104, such that there are no gaps between the holder 104 and the fluid applicator 102. Essentially, the top surface 140 of the fluid applicator 102 is in contact with the interior upper surface of the holder 104. Similarly, the side surfaces of the fluid applicator 102 are in contact with the interior side surfaces of the holder 104. Likewise, a portion of the bottom surface 142 remains in contact with the lip 112 as shown, even when the device is not in the inverted position and also when in the ready or inverted position as shown in FIG. 1. In an alternative embodiment, there is a small gap present between the top surface 140 of the fluid applicator 102 and the top portion of the interior of the holder 104. (See, for example, FIG. 12). Such a gap may be useful in embodiments in which the fluid 110 is more viscous, such as paint. Otherwise, such a gap may cause the fluid 110 to leak out of the device.

Figure 2:
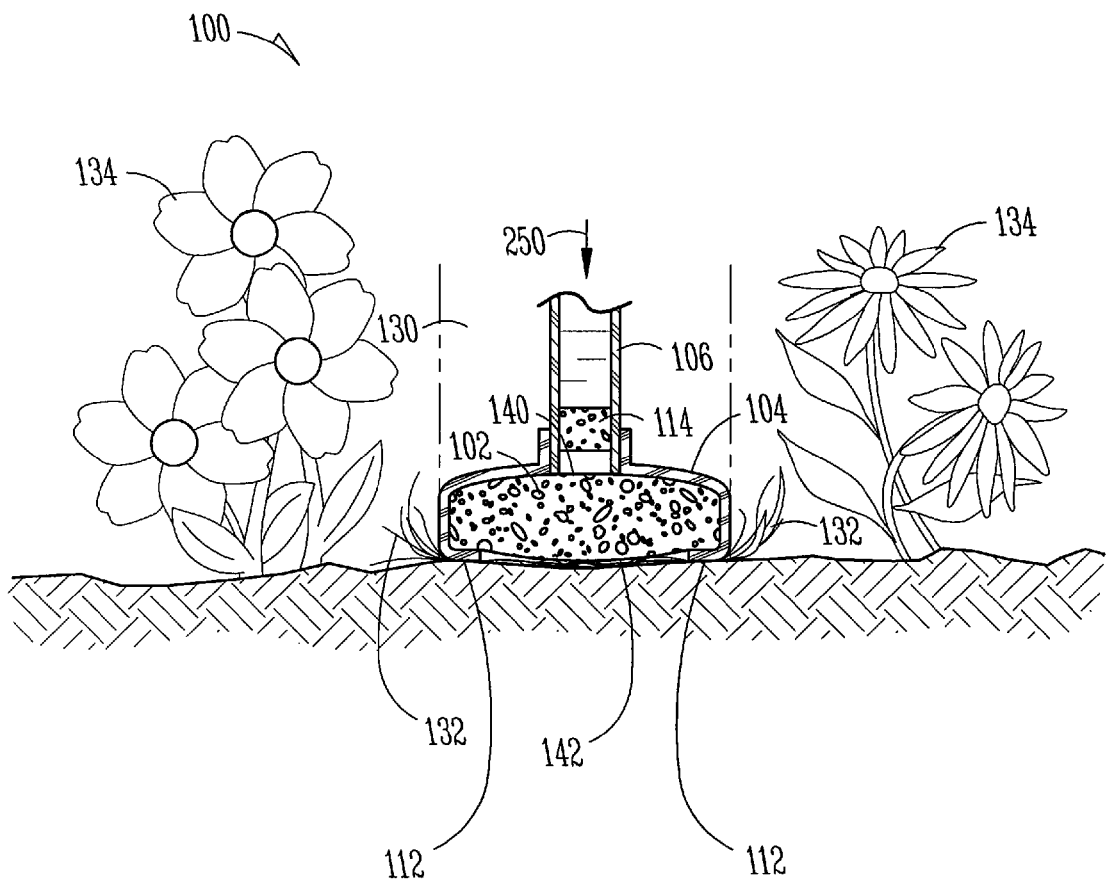
FIG. 2 is a vertical sectional view of the fluid application device of FIG. 1 in a second position in one embodiment of the present invention.

In most embodiments, fluid 110 is applied to the target area 130 by applying a downwardly force 250 to the device 100 as illustrated in FIG. 2. The force 250 causes the holder 104 to flex and compress against the top surface 140 of the fluid applicator 102 as shown, causing the bottom surface 142 of the fluid applicator 102 to bulge out to through the bottom opening 107 to at least the bottom edge of the lip 112, i.e., become convex in shape against the lip 112, and make contact with the target area 130. Although the lip 112 will likely remain in contact with the target area 130 during most applications, in some instances, such as when the surface of the target area 130 is uneven, it is possible for the fluid applicator 102 to extend past the bottom edge of the lip 112. In most embodiments, only minimal force need be exerted for a few seconds or less to cause the fluid 110 to be dispensed into the target area 130. In one embodiment, the force is no greater than the force required when using a toilet plunger. In some embodiments, the force is less than the force used with a toilet plunger. In one embodiment, the force needed is about five (5) to 10 $lb_f$. The compression of the fluid applicator 102 causes fluid 110 to be forced out of the fluid applicator 102 and onto the target area 130, thus contacting the non-desirable weeds 132. The flow rate can also be adjusted by various means as described below, including with the flow regulator 114 and/or by squeezing the reservoir 108 itself.

If a vacuum develops, the device 100 can be turned upside down, i.e., about 180 degrees, from the position shown in FIG. 1 causing air to enter the fluid applicator 102 and any type of porous fluid regulator 114 present. Alternatively, a vacuum can be removed by opening the optional vent 120. If no optional vent 120 is present, the vacuum can be removed by opening the cap 118 slightly to let air in. In most embodiments, the device 100 is shut off by turning it over an amount sufficient to prevent fluid 110 from exiting the reservoir 108. In one embodiment, the device 100 is turned about 180 degrees from the position shown in FIG. 1. Again, the device 100 can also be stored in this position. In one embodiment, a shut-off valve is provided, thus eliminating the need to store or hold the device in a particular position when not being used.

Figure 3:
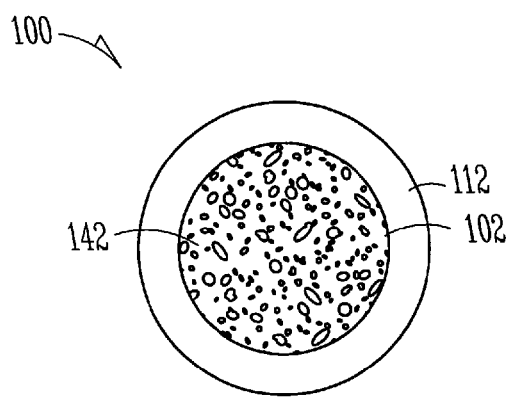
FIG. 3 is a bottom view of the fluid application device of FIG. 1 in one embodiment of the present invention.

Unlike known fluid application devices which only partially shield the fluid applicator such as by allowing it to be exposed on the sides, the various embodiments of the present invention provide complete shielding of the non-target area through use of a holder that not only covers the top and sides of the porous fluid applicator, but also covers a portion of the bottom surface 142 of the fluid applicator 102. In one embodiment, the lip 112 covers at least about five (5) % of the bottom surface 142 of the fluid applicator up to less than 100%. In one embodiment, the lip 112 covers less than about 50% of the bottom surface 142 of the fluid applicator 102. FIG. 3 shows a bottom view of the device with the lip 112 present around the entire circumference of the fluid applicator 102. In one embodiment, the bottom surface 142 is about 10 cm in diameter and the lip extends about one (1) cm around the perimeter of the bottom surface 142.

Figure 4:
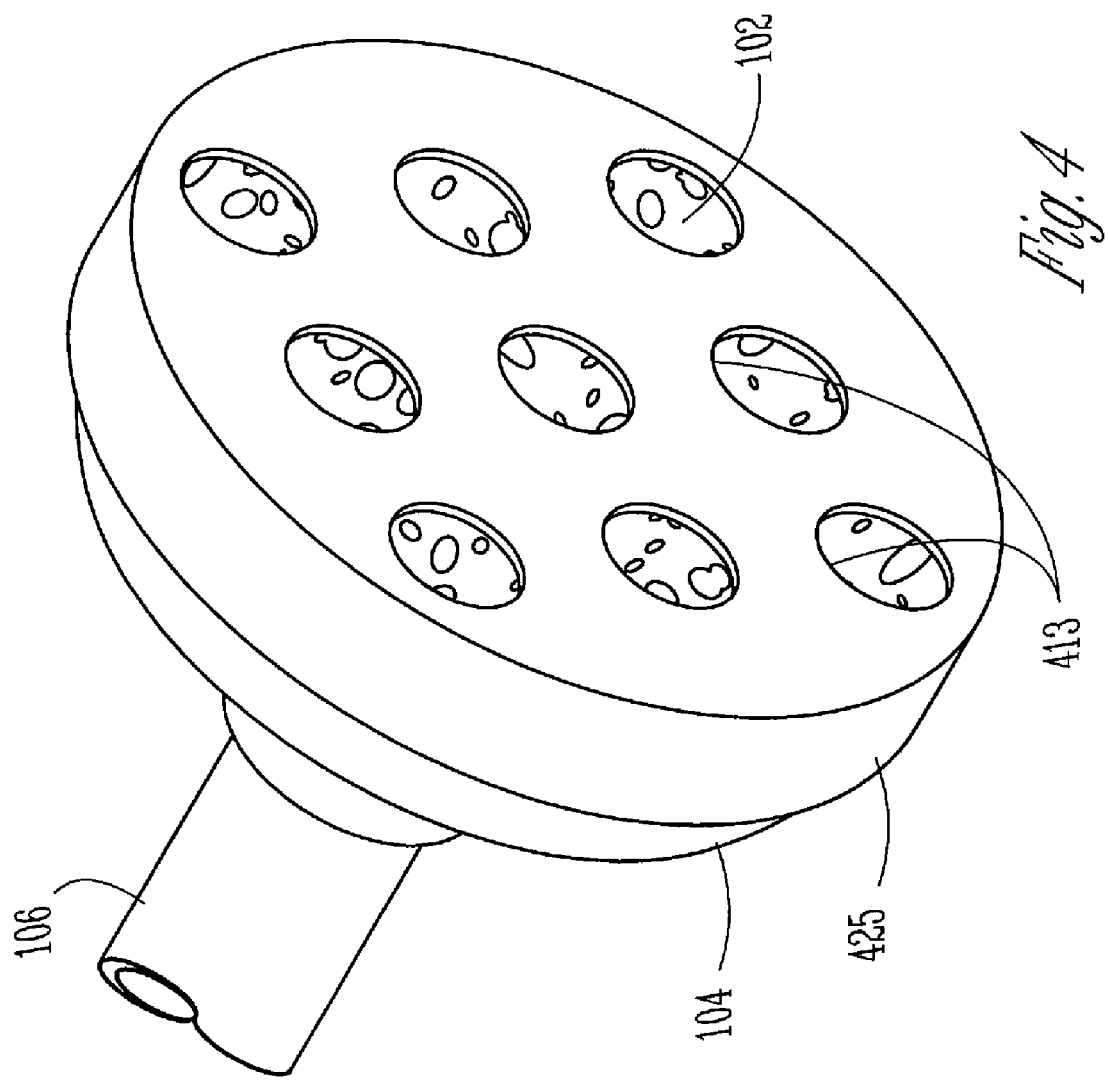
FIG. 4 is a simplified perspective view of a porous fluid applicator located inside a holder having a permanently affixed bottom cover with circular cover openings in one embodiment of the present invention.

In other embodiments, a cover 425 having any number of cover openings 413 through which the fluid applicator 102 can protrude during use is used. The cover 425 can be integral with the holder 104 as shown in FIG. 4. In such an embodiment, the fluid applicator 102 can either be permanently secured within the holder 104 or replaceable through a suitable opening in any portion of the holder 104, such as at the top opening (105) shown in FIG. 1 where it connects to the tube 106. In one embodiment, the cover 425 is permanently connected in at least one location to the holder 104, such as with a hinge. Alternatively, the cover 425 has a rim which is secured to the holder 104 in any suitable manner, such as with any suitable type of adhesive.

Figure 5:
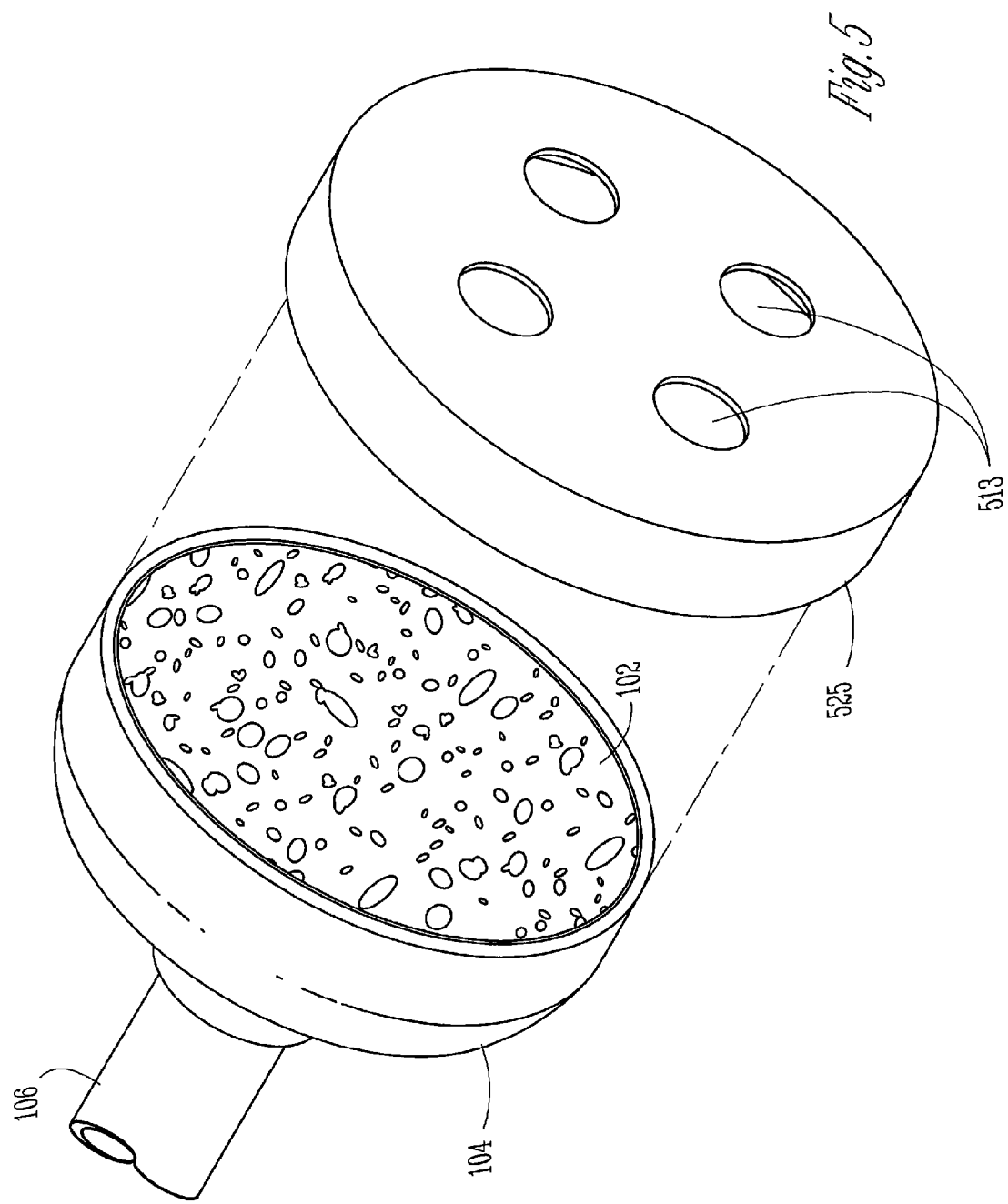
FIG. 5 is a simplified perspective view of a porous fluid applicator located inside a holder having a separate bottom cover with circular cover openings in one embodiment of the present invention.

In an alternative embodiment, a removable cover 525 is provided as shown in FIG. 5. The removable cover 525 can be secured to the holder 104 in any suitable way, such as with any type of snap-on means, screw-on means, and so forth. Use of any type of cover 425 or 525 during application of the fluid 110 provides a novel and convenient means for completely shielding the non-target area. Additionally, a cover may protect and prolong the life of the fluid applicator 102 contained therein. Use of a lip or cover, in combination with the side shielding provided by the sides of the holder and the top shielding provided by the top of the holder 104 and the bottom portion of the tube 106, provide a complete shielding system which prevents fluid 110 from being dispensed outside the target area 130.

As discussed above, the holder 104 and tube 106 can be connected in any suitable manner. In the embodiment shown in FIG. 1, the holder 104 and tube 106 are individual components which can be separated as needed. In other embodiments, the holder 104 is permanently secured to the tube 106 with any type of permanent sealing means known in the art. In an alternative embodiment, the holder 104 is attached to the tube 106 through any suitable type of male-female configuration.

Figure 6:
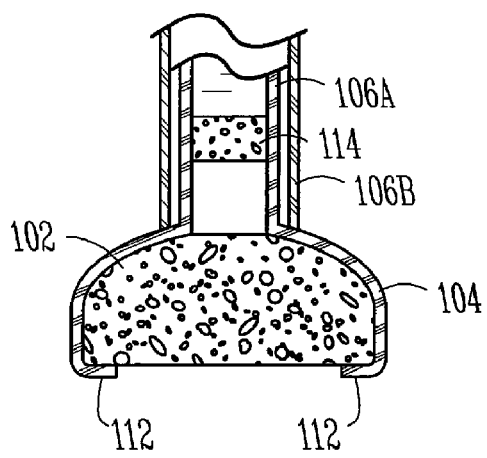
FIG. 6 is a sectional view of an integral flexible holder and flexible tube in one embodiment of the present invention.

In the embodiment shown in FIG. 6, the holder 104 and tube 106A are both flexible components which are integral with each other. In this embodiment, an outer rigid tube 106B is used to apply the necessary force to the flexible holder 104. The outer rigid tube 106B can remain relatively loose against the holder 104 when not in use. In an alternative embodiment both the holder and tube are rigid and a plunger device within the tube is used to compress the porous fluid applicator 102. Alternatively, a rigid holder can be made flexible through use of a central spring located near the top portion of the holder.

Figure 7:
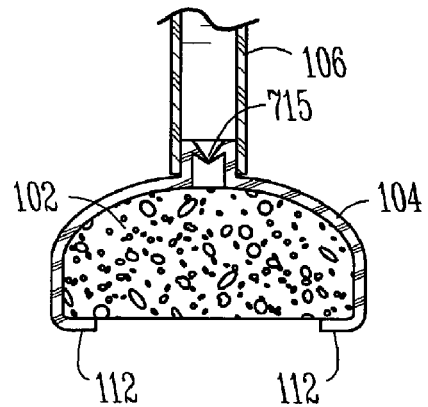
FIG. 7 is a sectional view of a press fit flexible holder and rigid tube joint in an alternative embodiment of the present invention.
Figure 8:
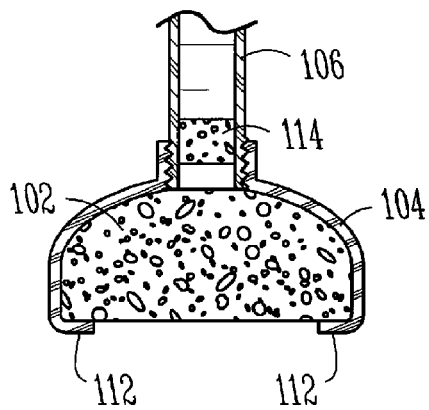
FIG. 8 is a sectional view of a threaded flexible holder and rigid tube joint in another alternative embodiment of the present invention.

In the embodiment shown in FIG. 7, the top portion 140 of the fluid applicator 102 contains a nipple 715 designed to fit tightly within the tube 106. Although FIG. 7 is shown with no flow regulator 114, in other embodiments, it may have a flow regulator. In fact, any of the embodiments described herein, can be used with or without a flow regulator 114, depending on the application. In another alternative embodiment, the holder 104 and tube 106 have threaded ends and are joined by being screwed together as shown in FIG. 8. In other alternative embodiments, the holder 104 is clamped to the tube 106 using any type of clamp known in the art.

Figure 9:
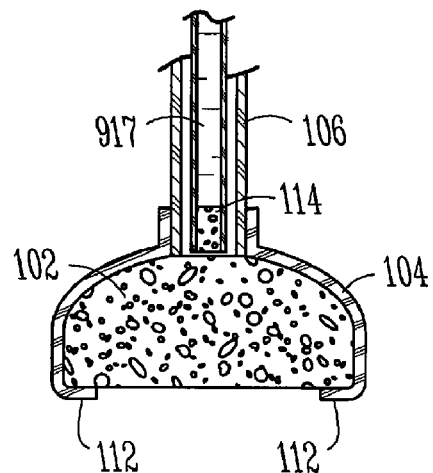
FIG. 9 is a sectional view of a press fit flexible holder and flexible tubing joint in one embodiment of the present invention.

Other configurations are possible with the fluid application device 100 described herein. In one embodiment, the holder 104 is secured directly to flexible tubing 917 located within the tube 106 as shown in FIG. 9. In this embodiment, both the flexible tubing 917 and the tube 106 are press fit into the holder 104.

Figure 10:
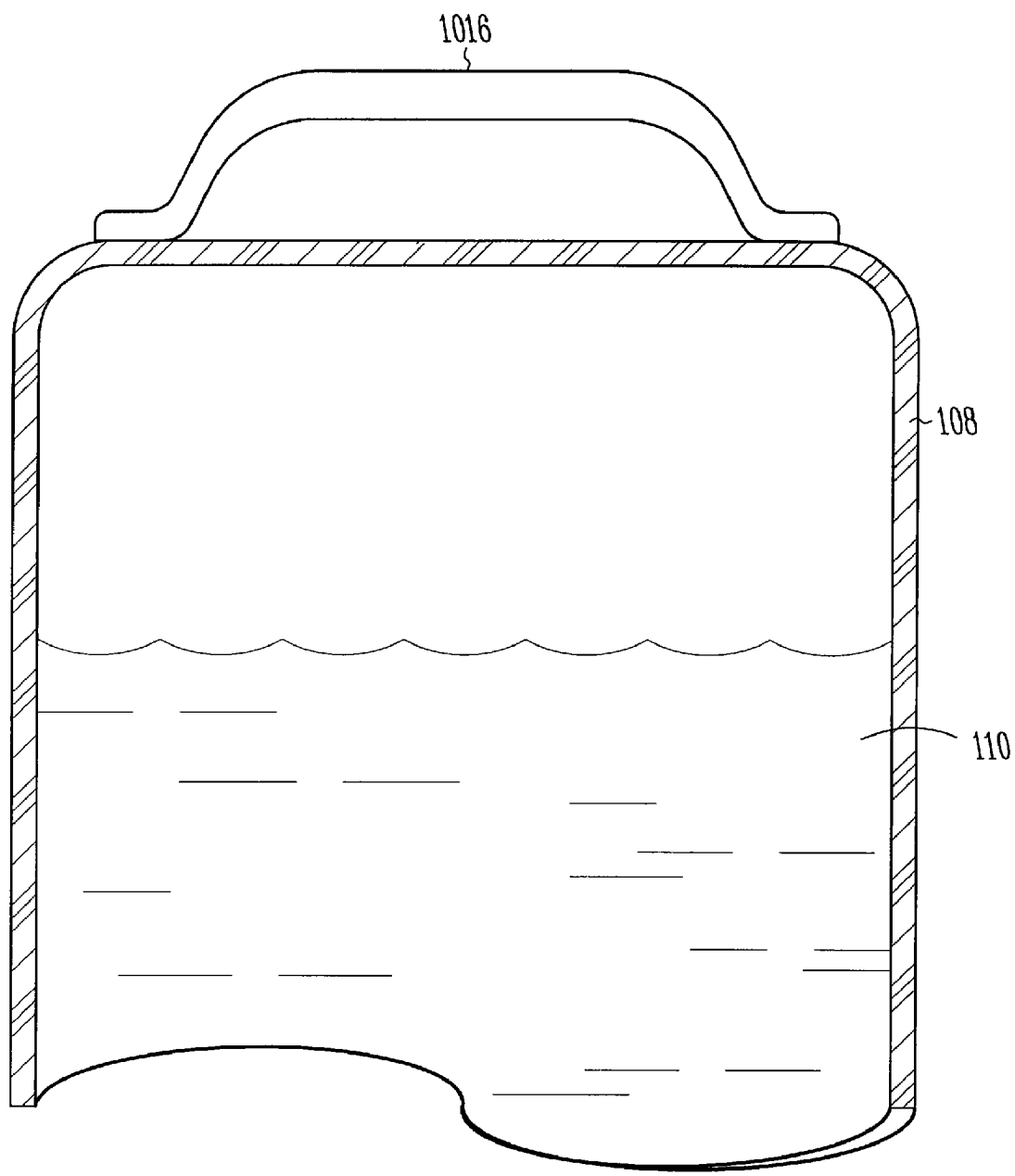
FIG. 10 is a simplified side view of an alternative handle in one embodiment of the present invention.

As noted above, any suitable type of handle or handles can be used, such as the enclosed opening 116 in FIG. 1. FIG. 10 show an alternative handle 1016 which extends above the reservoir 108 when in use. In one embodiment, the alternative handle 1016 can be folded against the reservoir 108. Any type of handle adds convenience to the device. In one embodiment, the handle or handles are integral with the reservoir 108. In one embodiment, up to three handles are provided which can be used in any combination desired with one or two hands.

The components can be made from any suitable materials which may or may not be reusable. In one embodiment, the tube 106 is made from any type of rigid material, such as any type of plastic of a thickness sufficient to resist bending during use. In a particular embodiment, the tube 106 is made from a rigid acrylic material. The holder 104 is made from any type of flexible material which can perform the intended function, such as a flexible rubber material similar to the type of material used in a toilet plunger. In another embodiment, a flexible plastic material is used.

The fluid applicator 102 is made from any material having sufficient porosity to allow the desired fluid 110 to pass through. In one embodiment, the fluid applicator 102 is made from any type of compressible natural material such as cellulose or any suitable compressible synthetic material, such as polyester, and so forth. In one embodiment, the fluid applicator 102 is made from any suitably-sized commercially available sponge, such as a household sponge.

The flow regulator 114 is made from a flexible or non-flexible porous material such as cellulose, or any suitable synthetic material such as polyester, flexible or non-flexible porous plastic, and so forth. The flow regulator 114 necessarily should have holes sized appropriately for the viscosity of the solution that is being used. In one embodiment, the flow regulator 114 is made from a porous material similar to the material used for the fluid applicator 102. In this way, the flow regulator 114 can be reusable (which may require rinsing or cleaning after use), has no moving parts and is further adjustable in size as it can be cut to any desired length and diameter. Use of non-flexible porous plastic for the flow regulator 114 provides an additional advantage because different pore sizes can be used to match the flow rate to the fluid 110 being applied. Generally, longer pieces of material will lower the flow rate while shorter pieces will allow a higher flow rate. Flow rate can also be increased or decreased by using a material with larger or smaller pores, respectively, although a larger piece of material, even if it has a large pore size could contribute to a slower flow rate.

The flow regulator 114 can be placed in any suitable location as long as it can perform the intended function. In embodiments which rely on a porous flow regulator, the flow regulator 114 is present in the lower portion of the tube 106 as shown in FIG. 1. If such a flow regulator 114 were located in the upper portion of the tube 106 flow would not be regulated because the column of fluid 110 would likely have enough pressure to cause the fluid applicator 102 to leak, such as when using low viscosity fluids 110. Use of the flow regulator 114 in the upper portion of the tube 106 may be more useful when applying thicker fluids 110, such as paint. In other embodiments, the flow regulator 114 is located within the holder 104, just above the fluid applicator 102 (See, for example, FIG. 9). Unlike known fluid application devices, such as U.S. Pat. No. 4,597,219, which relies only on wicking material for its flow regulator and utilizes gravity only for bringing the fluid to the wicking material, preferred embodiments of the present invention rely solely on gravity to move fluid 110 through the porous flow regulator 114, thus allowing for variations in fluid rate depending on the amount of pressure in the holder 108 and/or how the device is oriented, i.e., the effect of gravity.

The density and length of the material used for the flow regulator 114 can vary depending upon the diameter and length of the rigid tube 106, the viscosity of the fluid 110 being used, the desired flow rate, and so forth. In an alternative embodiment, the flow regulator 114 is any conventional type of mechanical flow regulator, such as a one-way valve or a restricting orifice which can be located anywhere within the tube 106 or elsewhere in the device 100. The flow rate can also be adjusted by squeezing the reservoir 108 as described above.

The device 100 can be made quite large or can be a smaller more compact device. The relative sizes and dimensions of the various components can vary considerably depending on the type of fluid being applied, the surface to which it is being applied, and so forth. In one embodiment, about 1.8 L of commercial liquid herbicide is contained within two (2) L reservoir of any suitable length and diameter, such as about 20 to 30 cm in length and about 10 cm in diameter. In this exemplary embodiment, the tube 106 is about 28 to 32 cm in length, with an internal diameter of about 4 to 6 mm and an external diameter of about 2 to 4 mm larger, such that the thickness of the tube 106 is about 2 to 4 mm. In such an embodiment, the holder 104 can have a diameter (at the bottom) of about 5 to 7 cm and a height of about 2 to 4 cm. The lip 112 in such an embodiment can be about 0.5 to 1.5 cm in width and encompasses the edge of the porous material 102. A polyester sponge made by Bruske Enterprises, Inc. having offices in Tinley Park, Ill., or a methylcellulose sponge made by The 3M Co. having offices in Saint Paul, Minn. can be used as both the porous material 102 and the fluid applicator 114. If necessary, the sponge, i.e., the fluid applicator 102, is cut to fit properly within the holder 104 to allow for a tight, compressed fit within the holder 104 which is appropriate for use with a thin liquid, such as the commercial liquid herbicide. The sponge which is to be used for the flow regulator 114 is (or can be cut to be) about 0.75 to 1.25 cm in length and about 8 to 14 mm in diameter such that it fits snugly within either the tube 106 or holder 104. The holder 104 might be chosen for the location of the flow regulator 114 rather than the tube 106 when faster flow rates are desired due to its larger diameter. Additionally, the device can likely be assembled more easily when the flow regulator 114 is placed in the holder 104. When placed within the tube 106, the flow regulator 114 is inserted just inside the end which is secured to the holder 104 or can be pushed up to about one (1) to two (2) cm within the tube 106. (Placement of the flow regulator 114 too high within the tube 106 will cause it not to function properly due to excess pressure from the fluid in the tube 106.

Figure 11:
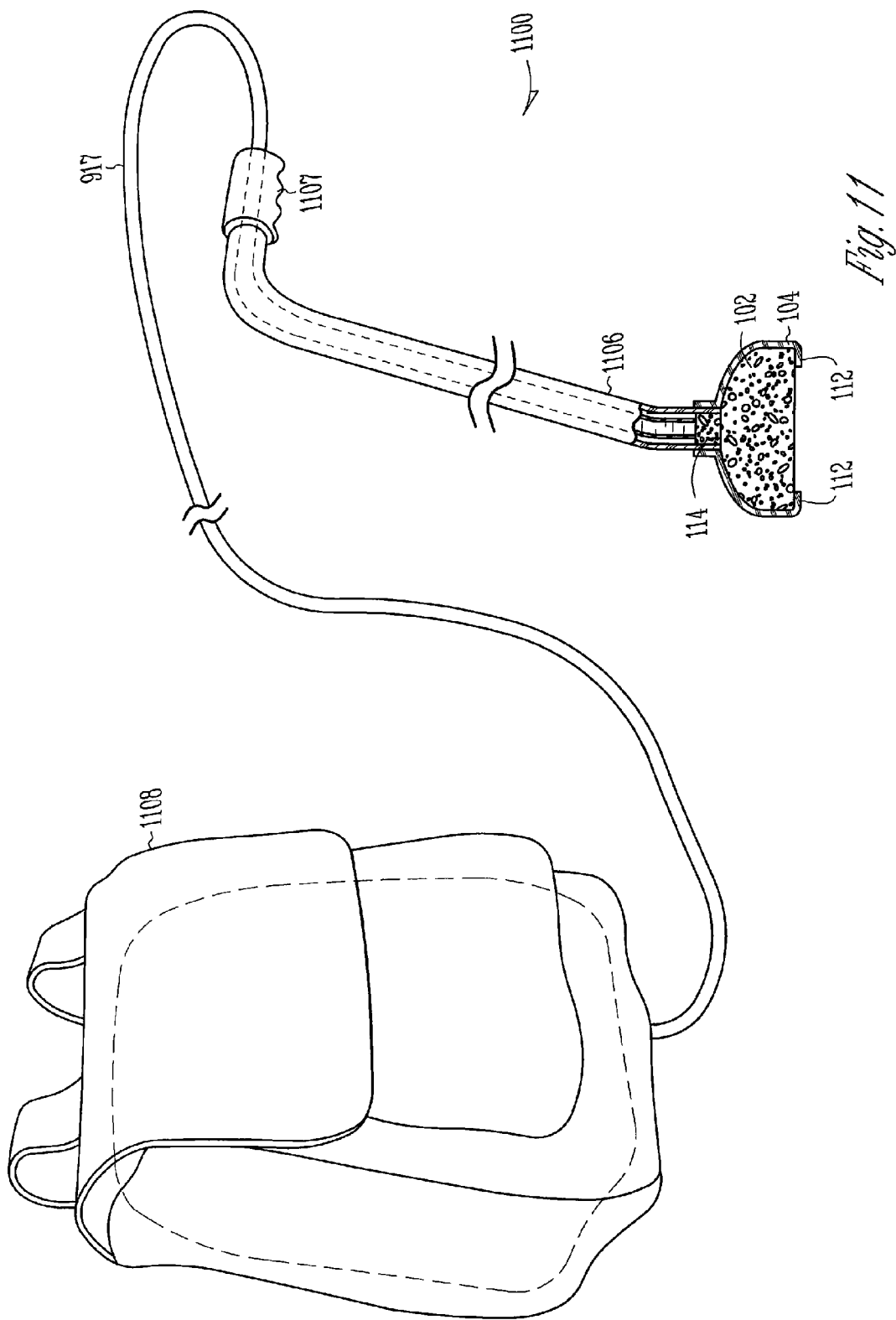
FIG. 11 is a side view of an alternative fluid application device having a backpack reservoir in one embodiment of the present invention.

An alternative fluid application device 1100 is shown in FIG. 11 with a backpack reservoir 1108. Alternatively, any type of container can be placed within a backpack and serve as a reservoir. Fluid flows from the backpack reservoir 1108 through flexible tubing 917 and into a handheld rigid tube 1106. In the embodiment shown in FIG. 11, the handheld rigid tube has a handgrip 1107, which can be straight or angled. In this embodiment, the cap (not shown) is secured to the flexible tubing 917 rather than the tube 106 shown in FIG. 1. In one embodiment, an optional shutoff valve is installed at any location above the holder 104. The holder 104 can be secured to the flexible tubing 917 in any of the ways described herein. See, for example, FIG. 9. Such an embodiment may be useful for larger household jobs or commercial applications.

Figure 12:
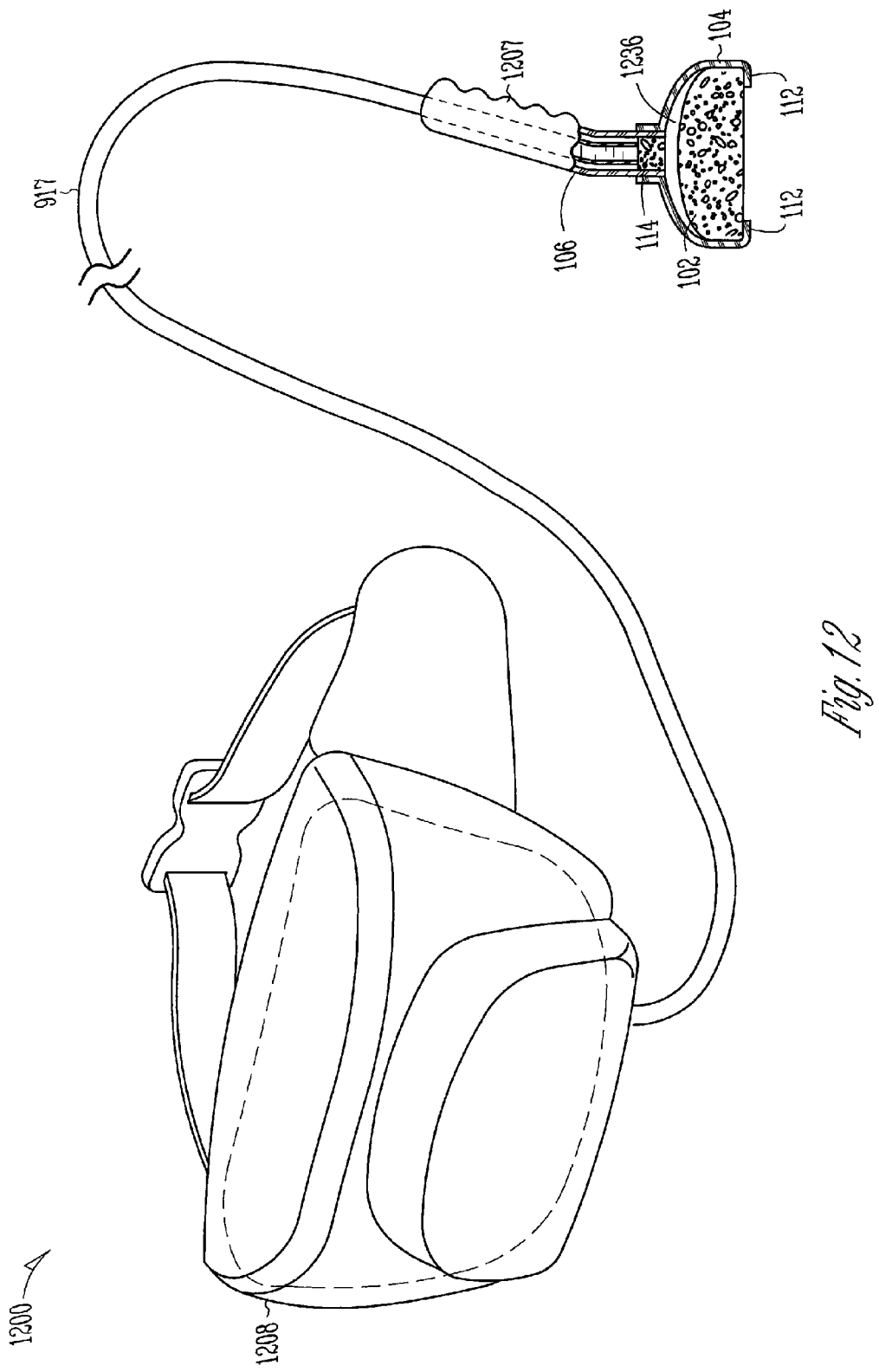
FIG. 12 is a side view of an alternative fluid application device having a fanny pack reservoir in one embodiment of the present invention.

In another alternative embodiment as shown in FIG. 12, a fanny-pack type reservoir 1208 can be used. Alternatively, any type of container can be placed within a fanny pack and serve as the reservoir. The fanny-pack type reservoir 1208 can be strapped around a user's waist or secured with any suitable securing device or devices directly to the user's belt. In the embodiment shown in FIG. 12, the flexible tubing 917 is attached directly to a holder 104 having a hand grip 1207 secured thereto or integral therewith. In this embodiment, the flexible tubing 917 runs directly through the hand grip 1207 and ends just above or can be in contact with the flow regulator 114. In an alternative embodiment, the flow regulator 114 is located in the hand grip 1207 and the flexible tubing 917 ends within the handgrip 1207 itself. In yet another embodiment, there is no flow regulator 114 and the flexible tubing 917 ends at any suitable location within the device 1200 as long as fluid is able to flow through the flexible tubing 917 and contact the fluid applicator 102, such as proximate to the fluid applicator 102, although the invention is not so limited. Such an embodiment is useful for applying fluid when working close to the target area, such as when kneeling or using a small cart, such as is often used in gardens. Such an embodiment can be particularly useful when applying fluid having non-target plants overhead. This alternative device 1200 is also useful in any of the other embodiments shown herein in which closer contact with the target area desired, i.e., in applications where there is no need for the added length of the tube 106. Although the embodiment shown in FIGS. 11 and 12 each contain a flow regulator 114, as noted above, in some embodiments, it may be possible to omit the flow regulator 114. (See, for example, FIG. 7).

FIG. 12 shows an exemplary alternative embodiment which has a gap 1236 present between the top surface 140 of the fluid applicator 102 and the top portion of the holder 104, although the invention is not so limited. As noted above, such an embodiment may be useful when a more viscous fluid, such as paint, is used. If necessary, the fluid applicator 102 is cut in order to be sized properly to create the gap 1236. In other embodiments in which the fanny-pack type reservoir 1208 is used, the fluid applicator 102 fills the entire interior of the holder 104 as described above.

In one embodiment, the reservoir 1108 or 1208 can be pressurized with any suitable type of pressure pump similar to any type of commercial sprayer such as a Hudson Model 17931 sprayer manufactured by Hudson Manufacturing Co. having offices in Chicago, Ill., although the invention is not so limited. In such an embodiment, the sprayer can be placed on the ground or on a movable cart rather than using a fanny-pack reservoir or the back-pack reservoir. Such a configuration would have the advantage of not requiring the user to hold the reservoir, thereby reducing fatigue. The risk of entanglement of the flexible tubing 917 with the user is also reduced. Such an embodiment can also allow for a larger reservoir to be used, if desired, thereby allowing longer periods of use before a fluid refill is required. This configuration further provides for faster application, which can be particularly useful in commercial applications. Such an embodiment would likely further have a shut-off valve to prevent the fluid from dispensing when the fluid applicator 102 is not in use.

As noted above, the target area 130 can also be any type of vertical or substantially vertical surface. Use of the device with such applications may require periodic "recharging" of the fluid applicator 102 with fluid by orienting the device with the cap opening 119 pointed in a downwardly direction in order to allow the fluid to be fed from the reservoir 108 via gravitational force. In another embodiment, any suitable type of pressurized sprayer can be added, such as a sprayer having a squeeze trigger located opposite the handgrip.

Figure 13:
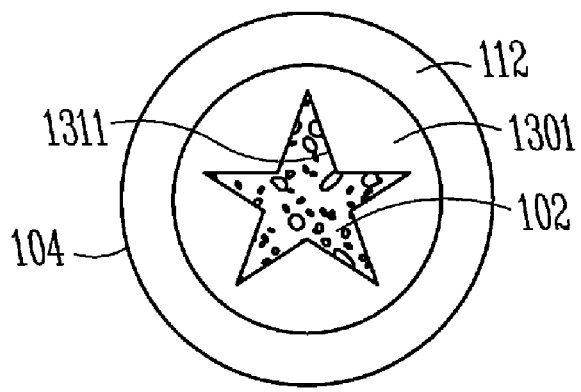
FIG. 13 is a bottom view of a stencil adapted to fit under a lip of the fluid application device wherein the stencil has a star-shaped stencil opening in one embodiment of the present invention.
Figure 14:
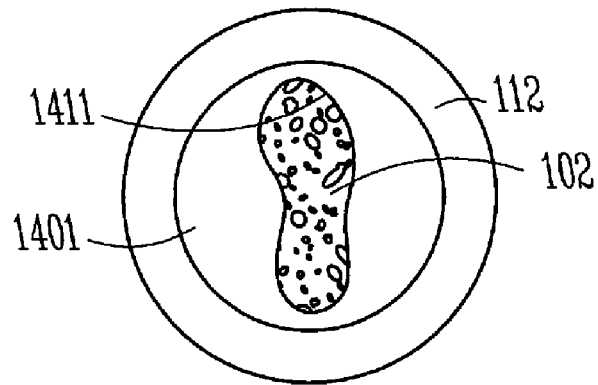
FIG. 14 is a bottom view of a stencil adapted to fit under a lip of the fluid application device wherein the stencil has a shoe-shaped stencil opening in one embodiment of the present invention.
Figure 15:
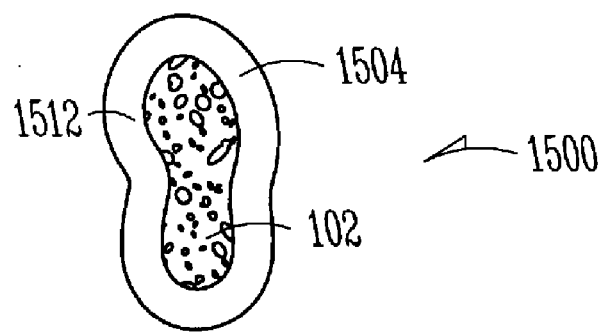
FIG. 15 is a bottom view of an alternative holder having a shoe shape in one embodiment of the present invention.

The fluid application device can also be used in combination with stencils sized to slip in between the lip 112 and the bottom surface of the fluid applicator 102 and be retained by the lip 112. The stencils can be made from any suitable material, such as plastic. In this way, paint can be used as the fluid 110 to apply various single or repeating designs, patterns, words, and so forth, to the target area. FIG. 13 shows the bottom of the holder 104 in combination with a stencil 1301 having a star-shaped stencil opening 1311. FIG. 14 shows the bottom of the holder 104 in combination with a stencil 1401 having a shoe-shaped stencil opening 1411. Any number of regular or irregularly-shaped patterns, designs, letters, numbers, and so forth, can be used as desired. As with the bottom covers described in FIGS. 4 and 5, the fluid applicator 102 bulges out through the stencil openings during use, thus allowing the desired fluid 110 to be applied to the target area 130. In another embodiment, the stencil is used to limit the amount of fluid applied, such as with an herbicide application. Use of such a stencil can also help to limit drying out of the fluid applicator 102. In one embodiment, the holder 104 has a unique shape matching the desired target area. FIG. 15 shows a device 1500 with a shoe-shaped holder 1504 and a shoe shaped lip 1512. In another embodiment, a bottom cover, such as described in FIGS. 4 and 5, can be used in the same manner, with custom cover openings in any of the shapes noted above replacing the circular cover openings 413 shown.

In one embodiment, the present invention comprises a kit containing the various components, which can include any combination of a reservoir, cap, tube, holder, porous fluid applicator and instructions on how to use the device. In one embodiment, fluid 110 is also provided with the kit either contained within the reservoir or in separate packaging. In one embodiment, the kit further includes one or more additional or replacement flow regulators, such as flow regulators of varying sizes and porosity. In one embodiment, the kit further includes replacement porous fluid applicators. In yet another embodiment, various stencils can also be provided.

The fluid application device described herein is easy to use and relatively inexpensive to produce. In preferred embodiments, there are no moving parts. Use of a reservoir as part of the device provides added convenience. The fluid applicator is further disposable and replacement fluid applicators can be sold separately. By limiting the exposed portion of the porous fluid applicator to only a portion of the bottom surface, complete shielding of the non-target area is provided.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present subject matter. Therefore, it is manifestly intended that embodiments of this invention be limited only by the claims and the equivalents thereof.

What is claimed is:

1. A fluid application device comprising:
   a holder;
   a tube connected to the holder;

a reservoir connectable to the tube;

a porous fluid applicator substantially enclosed by and compressed within the holder, wherein the holder also contacts at least a portion of a substantially flat outwardly-facing bottom surface of the porous fluid applicator;

a porous flow regulator contained within the holder or the tube, wherein the porous flow regulator is a gravity-dependent porous flow regulator adapted to receive fluid from the reservoir when the fluid application device is oriented with the porous flow regulator located below the reservoir, further wherein the porous flow regulator is adapted to be in non-wicking fluid communication with the porous fluid applicator; and free space between the porous fluid applicator and the porous flow regulator to prevent contact of the porous flow regulator with the porous fluid applicator, wherein an upper surface of the porous fluid applicator is substantially concave in relation to a bottom surface of the porous flow regulator.

2. The device of claim 1 wherein the tube is rigid and the holder is flexible.

3. The device of claim 1 wherein the holder contacts the bottom surface of the porous fluid applicator with a lip.

4. The device of claim 3 further comprising a stencil insertable between the lip and porous fluid applicator.

5. The device of claim 1 wherein the holder contacts the bottom surface of the porous fluid applicator with a cover.

6. The device of claim 5 wherein the cover is removable.

7. The device of claim 1 wherein the reservoir has one or more handles.

8. The device of claim 1 wherein the reservoir is a backpack or fanny pack or is contained within a backpack or fanny pack.

9. The device of claim 1 wherein the fluid is an herbicide.

10. The device of claim 1 wherein the reservoir is refillable.

11. The device of claim 1 wherein the flow regulator is located in a lower portion of the tube.

12. The device of claim 1 wherein the porous fluid applicator has a top surface in contact with the interior upper surface of the holder.

13. A method comprising:
providing a holder;
connecting a tube to the holder;
connecting a reservoir to the tube;
substantially enclosing and compressing a porous fluid applicator within the holder, wherein the holder also contacts at least a portion of a substantially flat outwardly-facing bottom surface of the porous fluid applicator; and containing a porous flow regulator within the holder or the tube, wherein the porous flow regulator is a gravity-dependent porous flow regulator adapted to receive fluid from the reservoir when the fluid application device is oriented with the porous flow regulator located below the reservoir, further wherein the porous flow regulator is in non-wicking fluid communication with the porous fluid applicator; and providing free space between the porous fluid applicator and the porous flow regulator to prevent contact of the porous flow regulator with the porous fluid applicator, wherein an upper surface of the porous fluid applicator is substantially concave in relation to a bottom surface of the porous flow regulator.

14. The device of claim 1 wherein the fluid is paint.

15. The device of claim 1 wherein the porous flow applicator is made from a sponge material.

16. A fluid application device comprising:
a flexible holder;
a tube connected to the flexible holder;
a reservoir connectable to the tube;
a porous fluid applicator having a circumference, the porous fluid applicator substantially enclosed by and compressed within the flexible holder, wherein the flexible holder includes a flexible lip which covers at least 5% of a substantially flat outwardly-facing bottom surface of the porous fluid applicator to provide a fully shielded porous fluid applicator capable of preventing dispensed fluid from contacting a surface beyond the circumference of the porous fluid applicator, wherein the reservoir is adapted to allow fluid to flow from the reservoir through the tube to the porous fluid applicator;

a porous flow regulator contained within the holder or the tube, wherein the porous flow regulator is a gravity dependent porous flow regulator made from a sponge material and adapted to be in non-wicking, gravity-dependent fluid communication with the porous fluid applicator; and free space between the porous fluid applicator and the porous flow regulator to prevent contact of the porous flow regulator with the porous fluid applicator, wherein an upper surface of the porous fluid applicator is substantially concave in relation to a bottom surface of the porous flow regulator.

* * * * *